United States Patent
Fujita

(10) Patent No.: US 8,264,604 B2
(45) Date of Patent: Sep. 11, 2012

(54) IMAGE PROCESSING APPARATUS AND IMAGE PROCESSING METHOD

(75) Inventor: Kazuhide Fujita, Tokyo (JP)

(73) Assignee: Sony Corporation, Tokyo (JP)

( * ) Notice: Subject to any disclaimer, the term of this patent is extended or adjusted under 35 U.S.C. 154(b) by 274 days.

(21) Appl. No.: 12/816,716

(22) Filed: Jun. 16, 2010

(65) Prior Publication Data
US 2011/0013080 A1    Jan. 20, 2011

(30) Foreign Application Priority Data
Jul. 14, 2009    (JP) .................. 2009-165195

(51) Int. Cl.
    *H04N 7/01*    (2006.01)
(52) U.S. Cl. ............................................. 348/448
(58) Field of Classification Search .................. 348/448, 348/441, 445, 452, 449, 453, 358, 459
See application file for complete search history.

(56) References Cited

U.S. PATENT DOCUMENTS

| 7,408,992 B2* | 8/2008 | Adams | 375/240.27 |
| 7,440,032 B2* | 10/2008 | Salzer et al. | 348/452 |
| 7,957,628 B2* | 6/2011 | Mizutani | 386/356 |
| 2008/0304568 A1* | 12/2008 | Chang | 375/240.16 |
| 2009/0009660 A1* | 1/2009 | Kageyama et al. | 348/452 |

FOREIGN PATENT DOCUMENTS

| JP | 2004-289753 | 10/2004 |
| JP | 2008-85993 | 4/2008 |

* cited by examiner

*Primary Examiner* — Paulos Natnael
(74) *Attorney, Agent, or Firm* — Oblon, Spivak, McClelland, Maier & Neustadt, L.L.P.

(57) ABSTRACT

A image processing apparatus includes an interlace/progressive converter that converts interlaced input image data into progressive image data; an up-convert material detector that detects low quality up-convert material likelihood of the interlaced input image data; and an image processor that obtains output image data by processing progressive image data on the basis of the detected signal of the up-convert material detector, wherein the up-convert material detector detects the low quality up-convert material likelihood on the basis of ratio of the sum of an inter-field pixel value difference and the sum of in-field pixel value difference, the pixels in a predetermined area being obtained as sequential notable pixels using image data of a first field and a second field that are continuous in each field.

8 Claims, 13 Drawing Sheets

FIELDS USED TO GENERATE INTERPOLATED
PIXELS USING IP CONVERSION

IMAGE PROCESSING APPARATUS AND IMAGE PROCESSING METHOD

BACKGROUND OF THE INVENTION

1. Field of the Invention

The present invention relates to an image processing apparatus and image processing method, and more particularly, to an image processing apparatus and the like, capable of favorably performing an image quality improvement with respect to a low quality up-convert material in which horizontal strips occur.

2. Description of the Related Art

Recently, with the start of digital broadcasting, image data of HD (High Definition) resolution are transmitted from the broadcasting station or the like. However, not all the image data transmitted from the broadcasting station or the like are the image data of HD resolution and may include image data of pseudo-HD resolution obtained by up-converting the image data of SD (Standard Definition) resolution used in the analogue broadcasting in the related art into HD resolution.

The image data of pseudo-HD resolution include material (hereinafter, referred to as "low quality up-convert material) prepared by up-converting the interlaced image data of SD resolution using in-field linear interpolation in the same interlaced image data. For example, there are 1080i image data obtained by up-converting image data of 480i or image data of 576i.

Further, interlaced image data of SD resolution before up-convert also include image data prepared by converting progressive image data (frame material) with 24 frames or 30 frames per second using a 2-3 pull down scheme or a 2-2 pull down scheme.

In the case of the low quality up-convert material described above, when converting the interlace scheme into the progressive scheme for image display using the field interpolation, there was a shortcoming that horizontal strips occurred at portions having luminance differences in the vertical direction. This is because there occurs a state in which pixel proximity and pixel value proximity are not matched between a certain field and its adjacent field in the vertical direction, when up-converting the interlaced image data of SD resolution using in-field linear interpolation in the same interlaced image data.

For example, Japanese Unexamined Patent Application Publication No. 2008-85993 describes that it is determined whether image data are up-convert material or not by detecting signals having a plurality of frequency bands and on the basis of signal amplitude of each frequency band. Further, for example, Japanese Unexamined Patent Application Publication No. 2004-289753 describes that it is determined whether image data are up-convert material or not by existence of the side panel of the image data having HD resolution.

SUMMARY OF THE INVENTION

In the technology described in the Japanese Unexamined Patent Application Publication No. 2008-85993, horizontal strips occurring when low quality up-convert material is converted from interlace scheme to progressive scheme is regarded as high frequency component, so that there is a concern that the low quality up-convert material is erroneously detected as image data of a normal HD resolution. Further, in the technology described in the Japanese Unexamined Patent Application Publication No. 289753, since all the up-convert material does not have the side panel attached thereto, it is not possible to detect the up-convert material that does not have the side panel. Further, in the Japanese Unexamined Patent Application Publication No. 289753, it is not possible to make a distinction between the low quality up-convert material in which the horizontal strips occur and normal up-convert material.

It is desirable to precisely detect the low quality up-convert material, thereby favorably enhancing image quality.

According to an embodiment of the present invention, there is provided an image processing apparatus including an interlace/progressive converter that converts interlaced input image data into progressive image data; an up-convert material detector that detects low quality up-convert material likelihood of the interlaced input image data; and an image processor that obtains output image data by processing progressive image data obtained by being converted in the interlace/progressive converter on the basis of the detected signal of the up-convert material detector, wherein the up-convert material detector detects the low quality up-convert material likelihood on the basis of ratio of the sum of an inter-field pixel value difference by pixel data of a notable pixel of the first field and a pixel of the second field adjacent to the notable pixel in the vertical direction, and the sum of in-field pixel value difference by pixel data of the notable pixel of the first field and a pixel of the first field adjacent to the notable pixel in the vertical direction, the pixels in a predetermined area being obtained as sequential notable pixels using image data of a first field and a second field that are continuous in each field.

According to the embodiment of the invention, interlaced input image data are converted into progressive image data by an interlace/progressive converter. The progressive image data obtained by being converted in the interlace/progressive converter generates horizontal strips at portions having luminance difference in the vertical when the interlaced input image data are the low quality up-convert material described above.

A low quality up-convert material likelihood of the interlaced image data is detected by the up-convert material detector. In the case of the low quality up-convert material described above, there exists a state that pixel proximity and pixel value proximity in the vertical direction are not matched between a certain field and its adjacent field (hereinafter, referred to as "horizontal strip generation state" suitably). In this up-convert material detector, it is determined whether this state exists or not.

In this up-convert material detector, the detection is performed for each field using image data of a first field and a second field that are continuous each other. First, pixels in a certain area become sequential notable pixels, and sum of inter-field pixel value differences and sum of in-field pixel value differences are obtained. Here, the inter-field pixel value differences are obtained by pixel data of a notable pixel of the first field and a pixel of the second field that is adjacent to the notable pixel in the vertical direction. Further, the in-field pixel value differences are obtained by pixel data of the notable pixel of the first field and a pixel of the first field that is adjacent to the notable pixel in the vertical direction.

When the interlaced input image data are the low quality up-convert material so that there exists the horizontal strip generation state, the sum of the inter-field pixel value differences is greater than the sum of the in-field pixel value differences. In the up-convert material detector, the low quality up-convert material likelihood is detected based on the ratio of the sum of the inter-field pixel value differences and the in-field pixel value differences. For example, when the ratio exceeds a predetermined threshold value that is greater than 1, the low quality up-convert material likelihood becomes high.

The progressive image data obtained by being converted in the interlace/progressive converter are processed by the image processor on the basis of the detection signal of the up-convert material detector so that the output image data are obtained. For example, progressive image data obtained by being converted in the interlace/progressive converter and image data obtained by performing a low pass filter process to the progressive image data in the vertical direction are mixed in a ratio that corresponds to the detection signal of the up-convert material detector to be output image data.

When the low quality up-convert material likelihood is high, mixture ratio of the image data obtained by performing the low pass filter process is high. Accordingly, the horizontal strip indication is suppressed. Further, when the low quality up-convert material likelihood is low, the mixture ratio of the image data obtained by being converted in the low pass filter process becomes low. Accordingly, it is prevented that the vertical resolution is lowered due to the fact the image data obtained by performing the low pass filter is unnecessarily used.

As such, according to the embodiment of the invention, the low quality up-convert material likelihood of the interlaced input image data is detected on the basis of the ratio of sum of the inter-field pixel value differences indicating the existence of the horizontal strip generation state and sum of the in-field pixel value differences, and the progressive image data obtained by being converted in the interlace/progressive converter are processed on the basis of the detection signal. Accordingly, the detection of the low quality up-convert material is performed at a high precision and the image quality is preferably improved.

According to another embodiment of the present invention, for example, the up-convert material detector may include an up-convert material determiner that outputs a first determination output when the ratio of a first sum and a second sum exceeds a predetermined threshold value and outputs a second determination output when the ratio is equal to or less than the predetermined threshold value, the first sum being the sum of the inter-field pixel value difference and the second sum being the sum of the in-field pixel value difference; a detection signal output unit that outputs a detection signal indicating the low quality up-convert material likelihood; and a determination stabilizer that determines whether the determination output for a predetermined number of the latest field of the up-convert material determiner includes a predetermined number of the first determination output or more for each field, and controls the detection signal output unit so as to raise the detection signal value when the determination output includes the predetermined number of the first determination output or more, and lowers the detection signal value when the determination output does not include the predetermined number of the first determination output or more.

In this case, even though the determination output of the up-convert material determiner was changed from the first determination output to the second determination output or from the second determination output to the first determination output, the detection signal indicating the low quality convert material likelihood output from the detection signal output unit is not changed sharply. Accordingly, for example, in the image processor, it is prevented that the mixture ratio of the image data obtained by performing the low pass filter process is changed sharply, and the image process is changed remarkably.

Further, according to further another embodiment of the present invention, for example, the up-convert material detector may further include an effectiveness determiner to determine whether the determination output of the up-convert material determiner is effective or not for each field; and wherein the determination stabilizer uses the determination output out of the up-convert material determiner for fields determined to be effective in the effectiveness determiner, and uses the second determination output for fields determined not to be effective in the effectiveness determiner. As such, when the determination output of the up-convert material determiner is determined not to be effective, it is possible to raise the precision of the detection signal indicating the low quality up-convert material likelihood output from the detection signal output unit by not using the determination output.

For example, when the interlaced input image data are interlaced image data prepared by converting progressive image data that have 24 frames or 30 frames per second using 2-3 pull down scheme or 2-2 pull down scheme, and the first field and the second field are not prepared from the image data of the same frame, sum of the inter-field pixel value differences is greater than sum of the in-field pixel value differences even though the interlaced input image data may not become the low quality up-convert material.

Accordingly, when the interlaced input image data are interlaced image data prepared by converting progressive image data that have 24 frames or 30 frames per second using 2-3 pull down scheme or 2-2 pull down scheme, the effectiveness determiner determines that the first field and the second field are effective for the fields prepared from the image data of the same frame.

Further, for example, in the case of moving image, even though the interlaced input image data are not the low quality up-convert material, the sum of the inter-field pixel value differences may be greater than the sum of the in-field pixel value differences. Accordingly, for example, when the interlaced input image data are not interlaced image data prepared by converting progressive image data that have 24 frames or 30 frames per second using 2-3 pull down scheme or 2-2 pull down scheme, the effectiveness determiner determines whether each field is a still field and determines the still field to be effective.

Further, for example, according to still further another embodiment of the present invention, the up-convert detector may further include a scene change determiner that determines whether a scene change occurs or not on the basis of the interlaced input image data, and the detection signal output unit may reset the detection signal as the minimum value when the scene change determiner determines that the scene change occurs. In the case that there was the scene change, there is a possibility that the material is changed. By resetting the detected signal to the minimum value when determined as the scene change, when changed to the material that is not the low quality up-convert material, for example, the image processor may immediately stop mixture of the image data obtained by performing the low pass filter process and prevent the vertical resolution from being unnecessarily deteriorated.

According to the embodiment of the present invention, the low quality up-convert material likelihood of the interlaced input image data is detected on the basis of the ratio of the sum of the inter-field pixel value differences and the in-field pixel value differences, the ratio indicating the existence of the horizontal strip generation state, the progressive image data obtained by being converted in the low quality up-convert material likelihood of the interlaced input image data are processed, thereby detecting the low quality up-convert material at a high precision and performing image quality improvement preferably.

BRIEF DESCRIPTION OF THE DRAWINGS

FIG. 5A to 5B-2 are diagrams illustrating an I/P conversion scheme in the case that interlaced input image data are video material;

DESCRIPTION OF THE PREFERRED EMBODIMENTS

Figure 1:
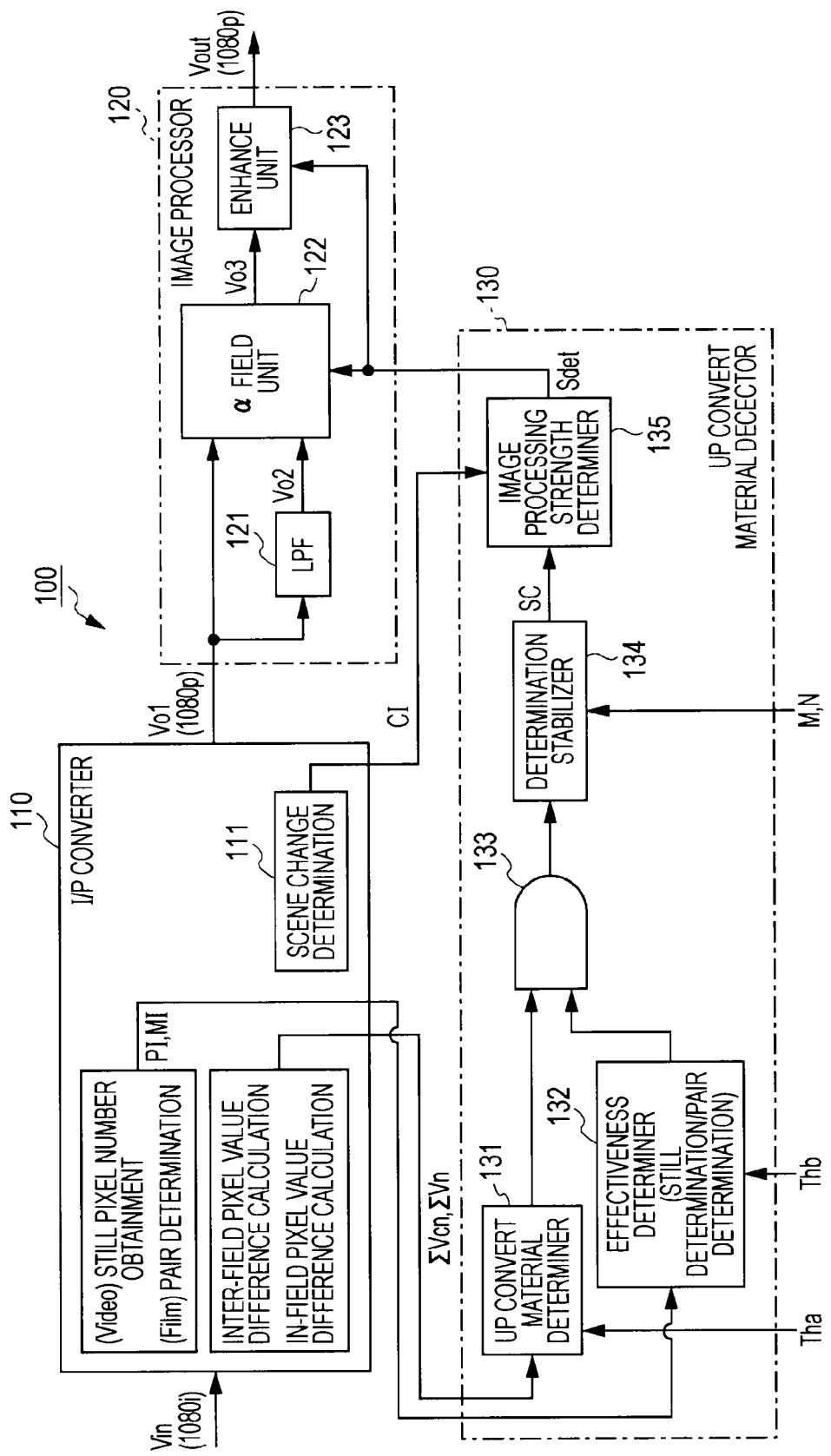
FIG. 1 is a block diagram illustrating a constructional example of an image processing apparatus as an embodiment.

Hereinafter, a feature to embody the invention (hereinafter, referred to as "embodiment") will be described.
1. Embodiments
2. Modified Embodiments
1. Embodiments
Construction of Image Processing Apparatus FIG. 1 is a constructional example of an image processing apparatus 100. The image processing apparatus 100 includes an I/P converter 110, an image processor 120, and an up-convert material detector 130. The I/P converter 110 converts interlaced input image data Vin into progressive image data Vo1. Here, the input image data Vin are image data of 1080i format and converted image data become image data of 1080p format.

Figure 2:
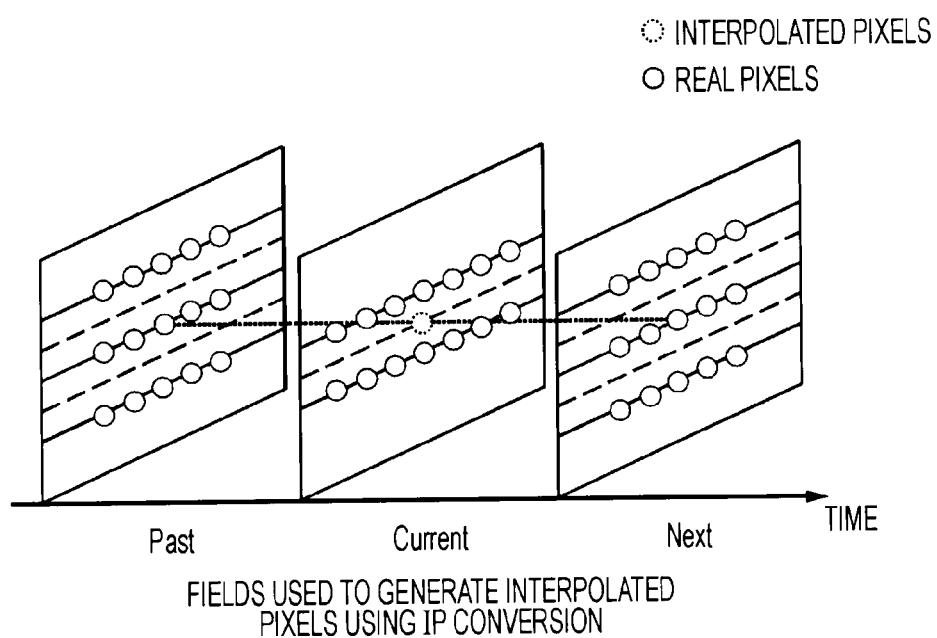
FIG. 2 is a diagram illustrating that an I/P conversion process is performed using image data of present (Next), 1 field previous (Current) and 2 fields previous (Past)

The I/P converter 110 performs conversion using image data of 3 field portions, present (Next), 1 field previous (Current) and 2 field previous (Past), as illustrated in FIG. 2. The image data of the present (Next) field input in the I/P converter 110 are preserved in a field memory not shown, and used as the image data of the past field.

The I/P converter 110 changes the I/P conversion method depending on whether the input image data Vin are video material or film material. The video material does not have a progressive image that is an original image. However, the film material has a progressive image that is an original image. The I/P converter 110 detects whether the input image data Vin are film material or not. When the data Vin are film material, the I/P converter 110 performs an I/P conversion process with respect to the film material and when the data Vin are not film material, it performs an I/P conversion process with respect to the video material.

Figure 3:
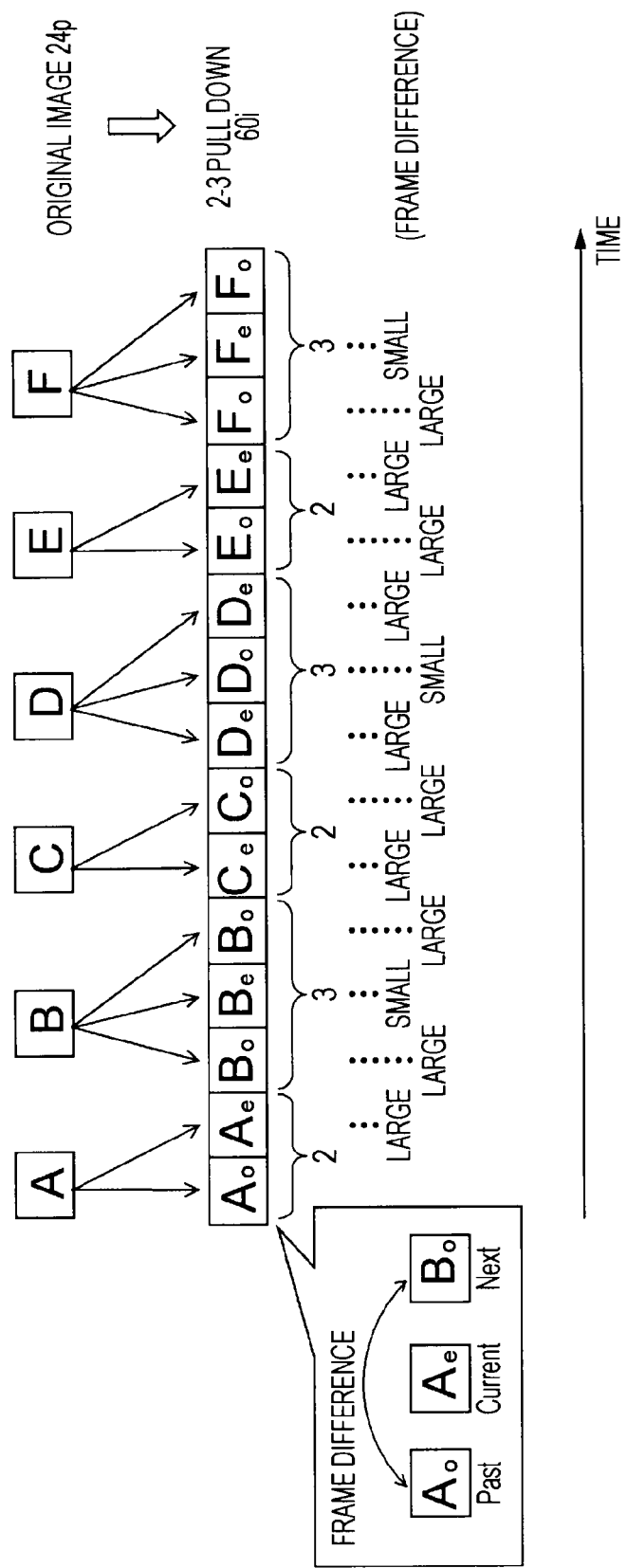
FIG. 3 is a diagram illustrating a detection scheme of a frame material for an I/P converter (conversion by 2-3 pull down scheme)

A film material detection method in the I/P converter 110 is explained with reference to FIG. 3. FIG. 3 explains a film material detection method in which an original image is a progressive image (24p) having an image of 24 sheets per second, and this original image is converted into an interlace image (60i) having an image of 60 sheets per second using 2-3 pull down method.

In order to convert an image having 24 sheets per second into an image of 60 sheets per second, only odd lines (o) and only even lines (e) of the progressive image of the original image are taken alternately 2 or 3 times. For example, an odd field Ao and an even field Ae of the interlace image (60i) are generated from A frame of progressive image (24p). Further, an odd field Bo, an even field Be and an odd field Bo of the interlace image (60i) are generated from a B frame that is continuous to the A frame of the progressive image (24p).

Such a film material has a better image quality when combining odd lines and even lines taken from frame such as progressive image of the original image rather than by performing an in-field interpolation. Accordingly, it is necessary to detect so called film material. A method to detect whether an input image data Vin is a film material or not includes a method to count a period of sum field differences of absolute values of luminance differences between the present (Next) field and the 2 field previous (Past) field.

In the film material illustrated in FIG. 3, the frame difference becomes small for every 5 fields as illustrated in the drawing, and something that is the film material is detected. That is, it becomes that the present (Next) field and the 2 field previous (Past) field that are used to obtain the frame difference for every 5 fields are generated from the same frame of the progressive image of the original image, and the frame difference becomes small.

Figure 4:
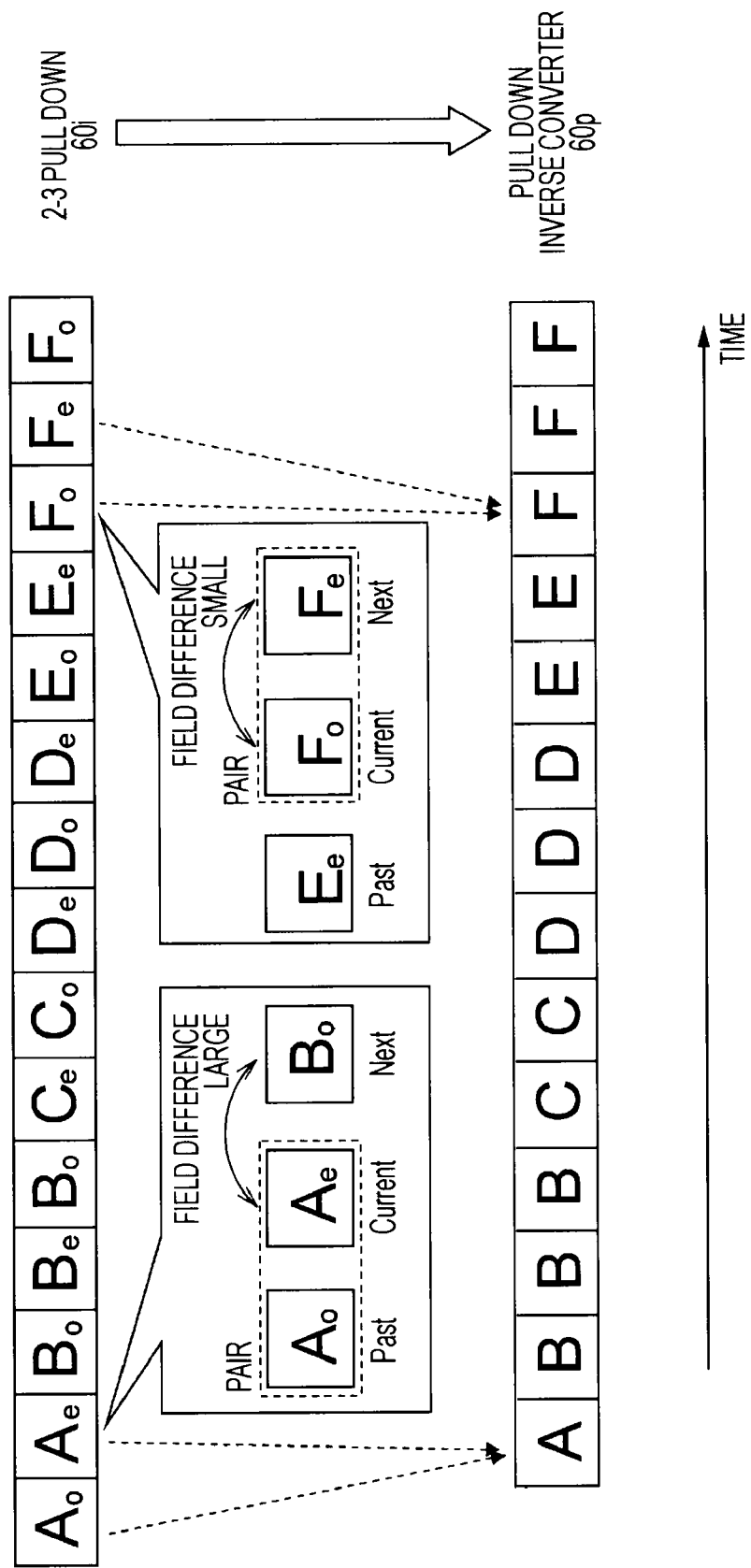
FIG. 4 is a diagram illustrating an I/P conversion scheme in the case that interlaced input image data are frame material.

FIG. 4 illustrates an I/P conversion method of an interlace image (60i) converted from a film material (progressive image (24p). When an input image data Vin is a film material described above, either of the present (Next) and 2 fields previous (Past) with reference to 1 field previous (Current) constitutes a pair. That is, it becomes that image data of 1 field previous (Current) field, and image data of either field of the present (Next) and 2 fields previous (Past) are taken from the same frame of the progressive image of the original image.

The I/P converter 110 performs a pull down inverse conversion that combines odd lines and even lines of 2 fields constructing a pair in fields of Current tense when performing I/P conversion of film material so as to generate frame image data. The I/P converter 110 determines which of the present (Next) and 2 fields previous (Past) constructs a pair using sum of the field differences of absolute values of luminance difference between 1 field previous (Current) field and the present (Next) field.

In this case, while the I/P converter 110 determines that the 2 fields previous (Past) field is a pair when the field difference is large, the present (Next) field is a pair when the field difference is small. The I/P converter 110 transmits pair determination information PI to the up-convert material detector 130 for each field when the input image data Vin is film material.

For example, referring to FIG. 4, when the Current tense is Ae field, the Ae field and Ao field of the 1 field previous (Current) construct a pair. In this case, image data of A frame constructing progressive image (60p) are generated by combination of each line of the Ao field and the Ae field. Further, for example, referring to FIG. 4, when the current tense is Fo field, the Fo field and Fe field of the present (Next) field construct a pair. In this case, image data of F frame constructing the progressive image (60p) are generated by combination of each line of Fo field and the Fe field.

A method of IP conversion of video material is explained. The I/P converter 110 prepares interpolation pixel data of Current tense by inter-field interpolation or in-field interpolation. In the inter-field interpolation, real pixel data of present (Next) and 2 fields previous (Past) fields are used. In the in-field interpolation, real pixel data of 1 field previous (Current) are used. The I/P converter 110 combines interpolation pixel data lines of Current tense with real pixel data lines of Current tense, so as to generate progressive image data.

The I/P converter 110 detects a motion of image corresponding to an interpolation position of a 1 field previous (Current) field. In this case, the motion of image is detected by comparing absolute values of luminance differences between frames or their sum with a threshold value using real pixel data of the present (Next) field and 2 fields previous (Past) field, or further using their adjacent real pixel data.

Figure 5A:
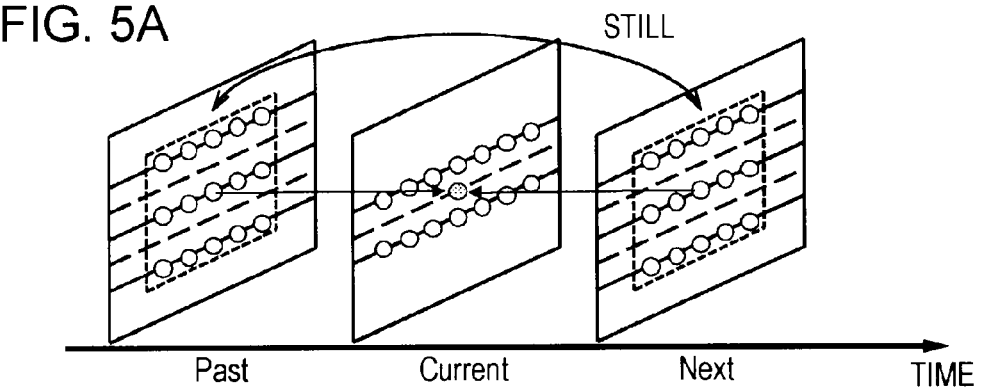

The I/P converter 110 performs an inter-field interpolation using a linear arithmetic operation when it is determined that the absolute values of the differences or their sum is smaller than the threshold value and the image is still. In this case, as illustrated in FIG. 5A, real pixel data of the present (Next) and 2 fields previous (Past) fields corresponding to an interpolation position are used. Meanwhile, the I/P converter 110 performs the in-field interpolation using a linear arithmetic operation of pixels on and under or adjacent the interpolation position as illustrated in FIG. 5B-1, when it is determined that the absolute values of the differences or their sum is greater than the threshold value and the image is moving.

Figures 1, 5B:
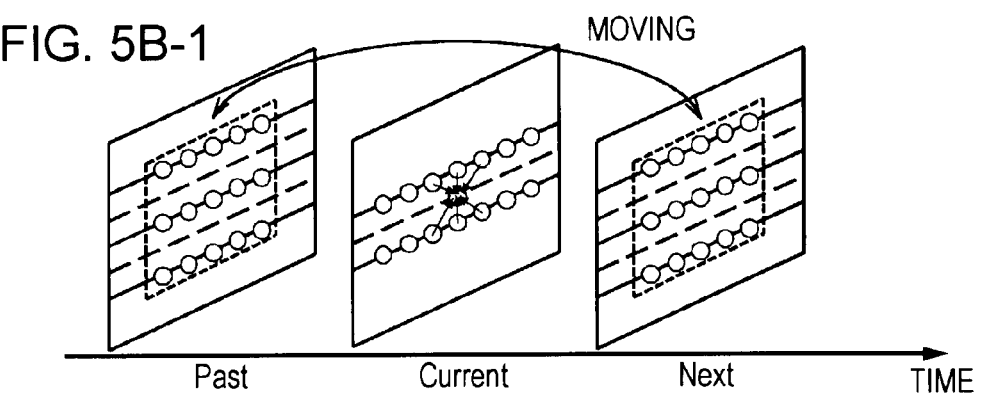
Figures 2, 5B:
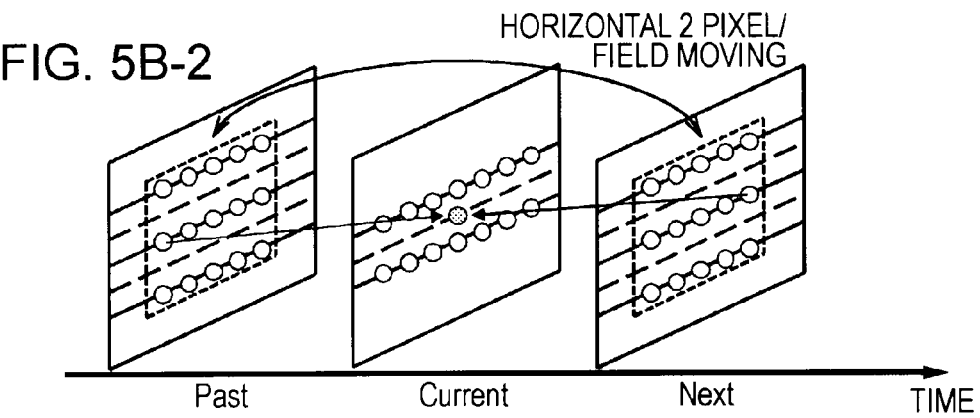

Further, when a motion (motion vector) between the present (Next) and the 2 fields previous (Past) fields is correctly obtained as illustrated in FIG. 5B-2, the I/P converter 110 sometimes performs the inter-field interpolation by estimating it from direction and size of the motion even in the case of motion. A method illustrated in FIG. 5B-1 is referred to a motion adaption type I/P conversion and a method illustrated in FIG. 5B-2 is referred to a motion compensation type I/P conversion. The low quality up-convert material has a problem when it is under a still I/P conversion illustrated in FIG. 5A.

Figure 6:
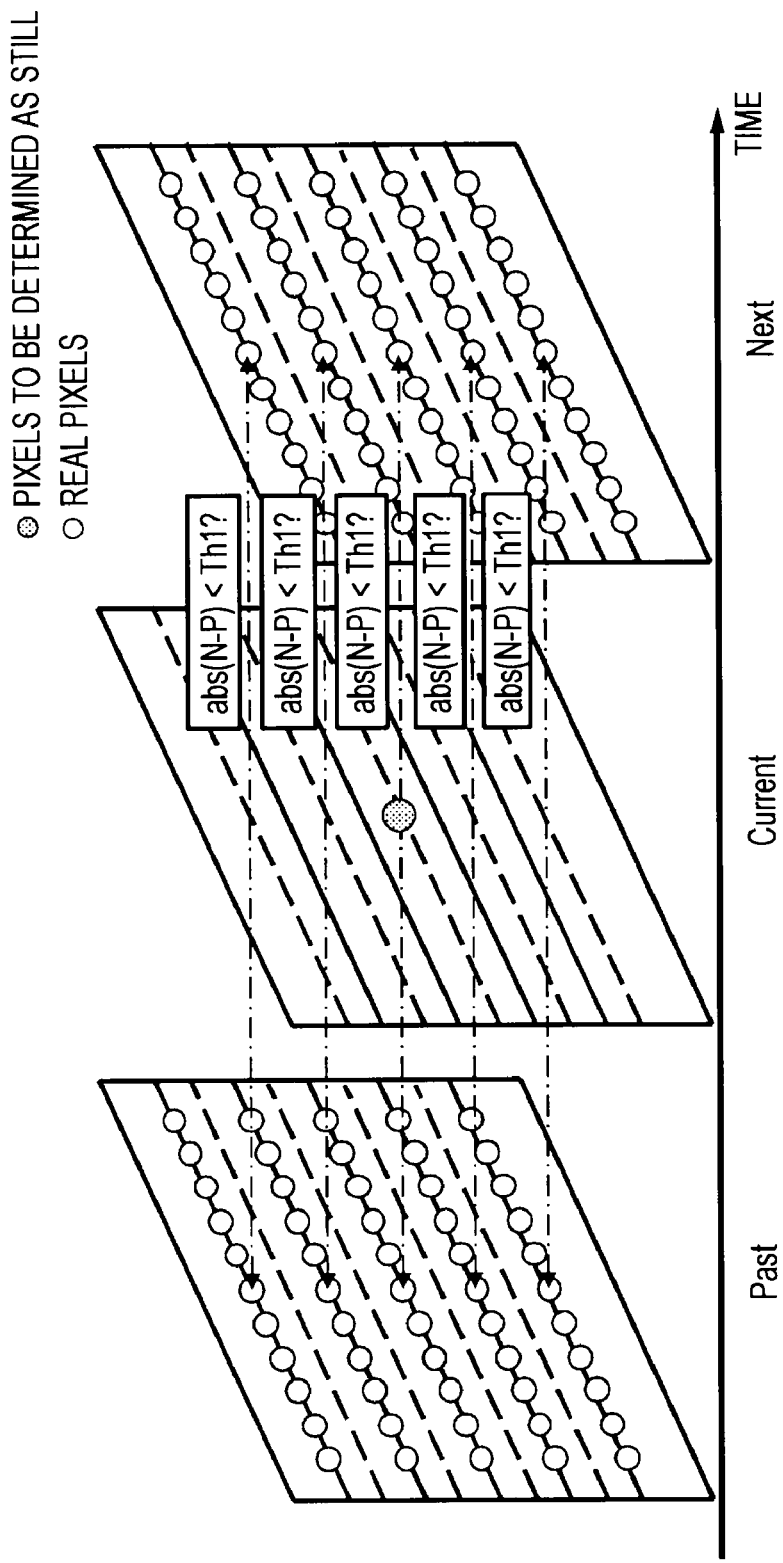
FIG. 6 is a diagram illustrating a condition 1 for an example of a still pixel determination in an I/P converter.
Figure 7:
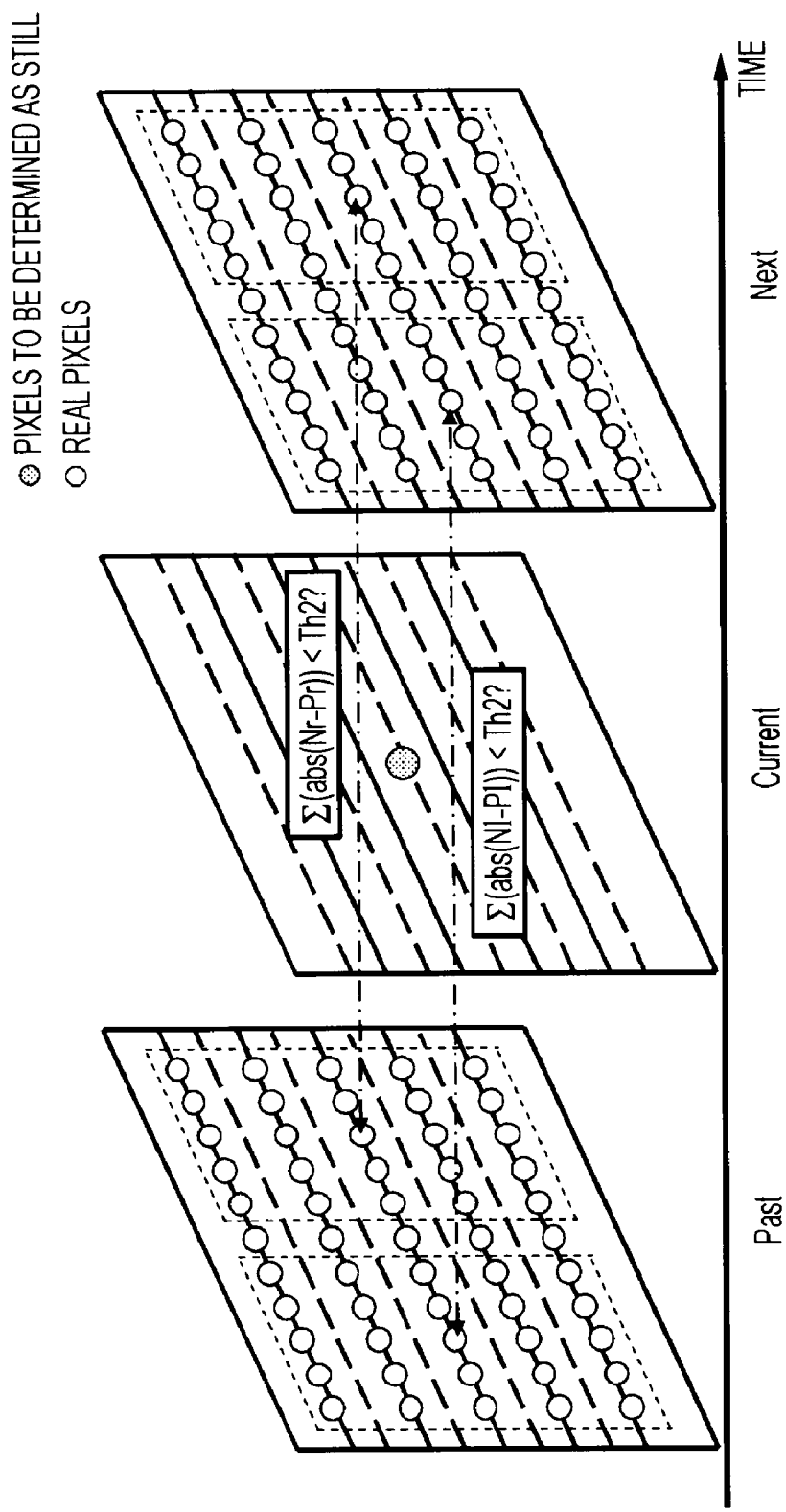
FIG. 7 is a diagram illustrating a condition 2 for an example of a still pixel determination for an I/P converter.

Here, an example of a still pixel determination in the I/P converter 110 will be explained with reference to FIGS. 6 and 7. The still pixel determination is a material to determine an interpolation method, and the inter-field interpolation is not determined to perform using its result only. The still pixel determination is performed by 2 conditions.

A first condition is explained as follows. As illustrated in FIG. 6, 5 luminance difference absolute values abs(N−P) corresponding to a pixel position of the still pixel determination of a 1 field previous (Current) field and pixel positions of upper 2 lines and lower 2 lines are calculated. The luminance difference absolute values abs(N−P) are absolute values between the present (Next) and the 2 field previous (Past) field. When all the 5 values is less than the threshold value Th1, the condition 1 is valid. When any 1 value reaches the threshold value Th1, the condition 1 is not valid.

A second condition is explained as follows. As illustrated in FIG. 7, in 5×5 pixels that are on the left and right of the pixel position of still pixel determination of the 1 field previous (Current) field, each sum of luminance difference absolute values between the present (Next) and 2 fields previous (Past) fields is calculated. Referring to the drawing, sum of luminance difference absolute values of left side is $\Sigma(abs(Nl-Pl))$ and sum of luminance difference absolute value of right side is $\Sigma(abs(Nr-Pr))$. When both 2 sums of difference absolute values were less than a threshold value Th2 (may be set differently from the threshold value Th1 used in the condition 1), the condition 2 is valid.

When both of the conditions 1 and 2 is valid, the I/P converter 110 determines that the pixel of the 1 field previous (Current) field to be determined whether it is still is still. The I/P converter 110 repeatedly performs the same process at all the interpolation pixel position of the 1 field previous (Current) field. When the input image data Vin are video material, the I/P converter 110 obtains the number of pixels that are determined to be still in the entire screen each field and sends the number information MI to the up-convert material detector 130.

Referring back to FIG. 1, the up-convert material detector 130 detects a low quality up-convert material likelihood of the interlaced input image data Vin. The up-convert material detector 130 includes an up-convert material determiner (up-convert determiner) 131, an effectiveness determiner 132, an AND circuit 133, an determination stabilizer 134 and an image process strength determiner 135.

The up-convert material determiner 131 determines whether the interlaced input image data Vin are the low quality up-convert material for each field. The up-convert material determiner 131 makes a determination using image data of 2 fields, the present (Next) field and the 1 field previous (Current) field.

The up-convert material determiner 131 determines whether the input image data Vin are the low quality up-convert material or not, on the basis of ratio of sum of the inter-field pixel value difference and sum of in-field pixel value differences that are obtained by making pixels of a predetermined area in the screen as sequential notable pixels. The predetermined area in the screen, for example, is set to make an exemption of the lower area or the like on which text information may be overlaid. The text information may be overlaid after the up-convert. In this case, since image data of HD resolution are originally overlaid on the area on which the text information is overlaid, there is a concern that the determination of whether the interlaced input image data Vin are the low quality up-convert material or not is erroneously made if the overlaid area of the text information is not exempted.

Figure 8:
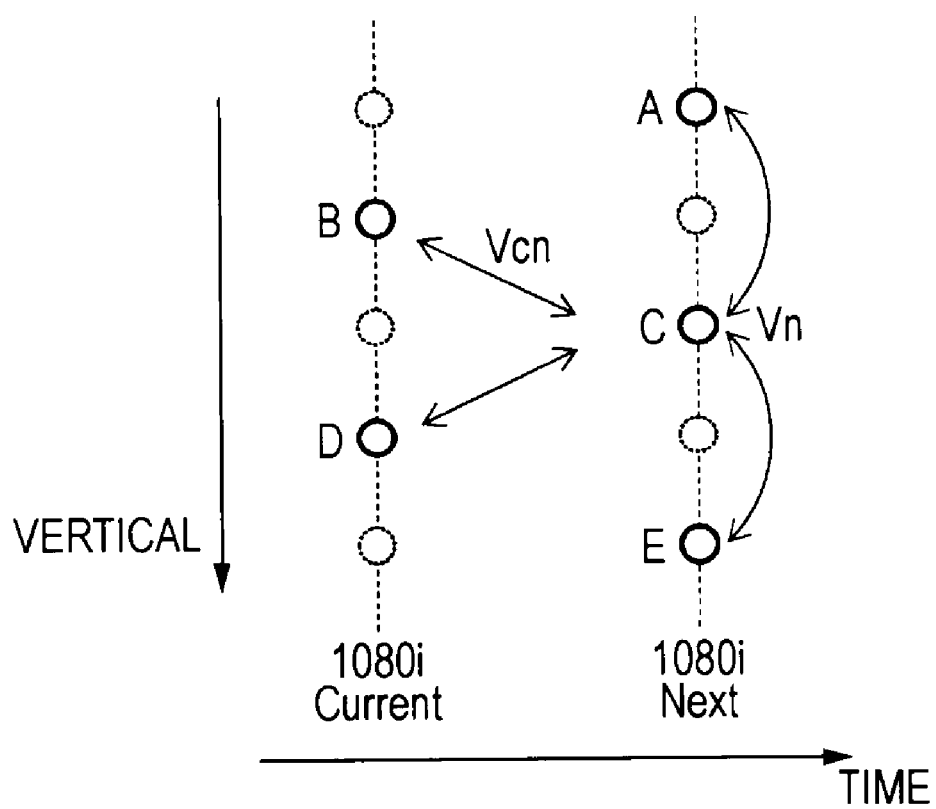
FIG. 8 is a diagram illustrating pixels used when obtaining inter-field pixel value difference and in-field pixel value difference.

The inter-field pixel value difference Vcn is obtained by a following equation (1) using data of notable pixel C of the present (Next) field and pixels B and D of the 1 field previous (Current) field adjacent to the notable pixel C in the vertical direction as illustrated in FIG. 8. Further, in the equation (1), B, C and D indicate pixel values (pixel data) of pixels B, C and D, respectively.

$$Vcn=abs(B+D-2C) \quad (1)$$

Further, the in-field pixel value difference Vn is obtained by following equation (2) using data of notable pixel C of the present (Next) field and pixels A and E of the current (Next) field adjacent to the notable pixel C in the vertical direction as illustrated in FIG. 8. Further, in the equation (2), A, C and E indicate pixel values of pixels A, C and E, respectively.

$$Vn=abs(A+E-2C) \quad (2)$$

The up-convert material determiner 131 compares the ratio of $\Sigma Vcn$, the sum of the inter-field pixel value differences and $\Sigma Vn$, the sum of the in-field pixel value differences, $\Sigma Vcn/\Sigma Vn$ with the threshold value Tha. Further, the up-convert material determiner 131 determines whether the interlaced input image data Vin are the low quality up-convert material or not on the basis of the comparison result. In the case of the low quality up-convert material, there exists a horizontal strip generation state in which a pixel proximity and a pixel value proximity are not matched in the vertical direction between a certain field and its adjacent field.

When the horizontal strip exists as described above, the sum of the inter-field pixel value differences, $\Sigma Vcn$, is greater than the sum of the in-field pixel value differences, $\Sigma Vn$. Accordingly, the ratio, $\Sigma Vcn/\Sigma Vn$ is greater than 1. The threshold value Tha is set a predetermined value greater than 1. The up-convert material determiner 131 determines that the interlaced input image data Vin are the low quality up-convert material when the ratio, $\Sigma Vcn/\Sigma Vn$ exceeds the threshold value Tha, and outputs a high level signal, "1". Further, the up-convert material determiner 131 determines that the interlaced input image data Vin are not the low quality up-convert material when the ratio, $\Sigma Vcn/\Sigma Vn$ is equal to or less than the threshold value Tha, and outputs a low level signal, "0".

The up-convert material determiner 131 may perform an arithmetic operation of the sum of the inter-field pixel value differences, $\Sigma Vcn$ and an arithmetic operation of the sum of the in-field pixel value differences, $\Sigma Vn$ by itself. However, in the embodiment, the arithmetic operation of the sum of the inter-field pixel value differences, $\Sigma Vcn$ and the arithmetic operation of the sum of the in-field pixel value differences, $\Sigma Vn$ are performed in the I/P converter 110. The up-convert material determiner 131 obtains the sums, $\Sigma Vcn$ and $\Sigma Vn$ from the I/P converter 110, calculates the ratio, $\Sigma Vcn/\Sigma Vn$, and performs the determination by comparing the ratio with the threshold value Tha as described above.

The effectiveness determiner 132 determines the effectiveness of the determination output of the up-convert material determiner 131 for each field. For example, when the input image data Vin are the film material described above, even though the input image data Vin are not the low quality up-convert material, the sum of the inter-field pixel value differences, $\Sigma Vcn$ may be greater than the sum of the in-field pixel value differences, $\Sigma Vn$.

As described above, the sums $\Sigma Vcn$ and $\Sigma Vn$ are calculated using image data of 2 fields of the present (Next) and 1 field previous (Current). When the 2 fields do not construct a pair (referring to the case that the Current tense of FIG. 4 is Ae field), even though the input image data Vin are not the low quality up-convert material, there is a case of $\Sigma Vcn>\Sigma Vn$.

When the input image data Vin are film material, pair determination information PI is transmitted to the effectiveness determiner 132 from the I/P converter 110 for each field. The pair information PI indicates which of the current (Next) field and 2 fields previous (Past) field constructs the 1 field previous (Current) field and pair.

Accordingly, the effectiveness determiner 132 determines the effectiveness of the determination output of the up-convert material determiner 131 described above on the basis of the pair determination information PI for each field when the input image data Vin are film material. In this case, the effectiveness determiner 132 determines to be effective when the present (Next) field constructs a pair, and outputs a high level signal "1" as a determination output. Further, the effectiveness determiner 132 does not perform the determination output when the 2 fields previous (Past) field constructs a pair.

Further, for example, when the input image data Vin are the video material described above, even though the input image data Vin are not the low quality up-convert material, there is a case that the sum of the inter-field pixel value differences, $\Sigma Vcn$ is greater than the sum of the in-field pixel value differences, $\Sigma Vn$. As described above, the sums, $\Sigma Vcn$ and $\Sigma Vn$ are calculated using the image data of 2 fields of the present (Next) and the 1 field previous (Current). In the case of moving time when there is a motion in the image of each field, even though the input image data Vin are not the low quality up-convert material, there is a case of $\Sigma Vcn>\Sigma Vn$.

When the input image data Vin are video material, number information MI indicating the number of pixels determined to be still in the entire screen is transmitted to the effectiveness determiner 132 from the I/P converter 110 for each field as described above. Accordingly, when the input image data Vin are video material, the effectiveness determiner 132 determines the effectiveness of the determination output of the up-convert material determiner 131 for each field on the basis of the number information MI as described above. In this case, when the number of the pixels determined to be still in the entire screen exceeds a predetermined threshold value Thb, the effectiveness determiner 132 determines the determination output to be effective and outputs a high level signal "1" as the determination output. Further, when the number of pixels determined to be still in the entire screen is equal to or less than the predetermined threshold value Thb, the effectiveness determiner 132 determines the determination output not to be effective and outputs a low level signal "0" as the determination output.

Figure 9:
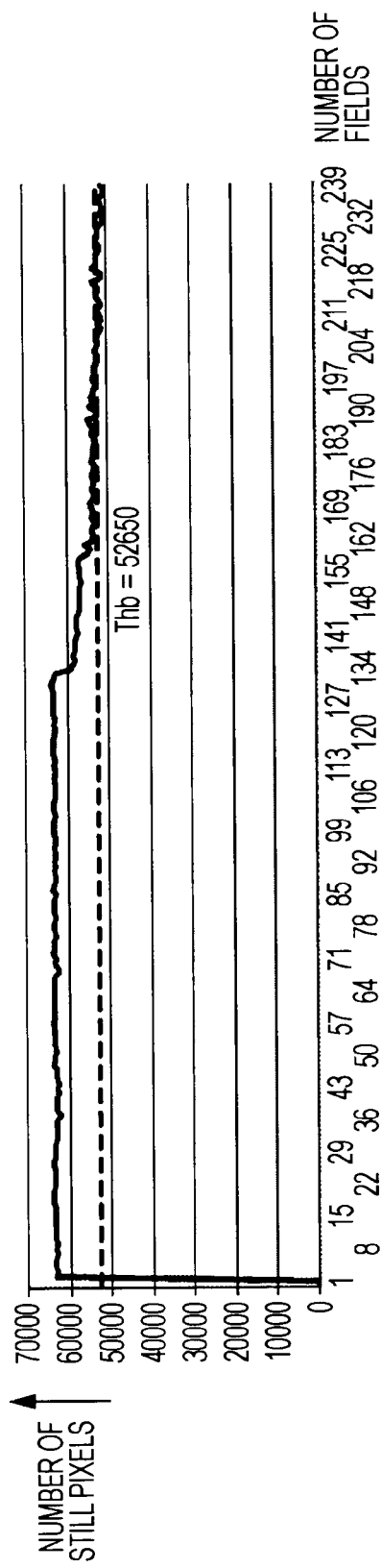
FIG. 9 is a diagram illustrating an example of change of the pixel number determined to be still (still pixel number) in entire screen for each field.

Further, the threshold value Thb is set about 80% of the number of pixels in the entire screen, for example. FIG. 9 illustrates a modified example of the number of pixels determined to be still in the entire screen (the number of still pixels) for each field. Further, referring to FIG. 9, Thb=52650, and the effectiveness determination is obtained in the field in which the number of still pixels exceeds 52650.

The AND circuit 133 takes a logic product of a determination output of the up-convert material determiner 131 described above and a determination output of the effectiveness determiner 132 described above. That is, determination outputs of the up-convert material determiner 131 and the effectiveness determiner 132 are input to the AND circuit 133. The AND circuit 133 outputs the determination output of the up-convert material determiner 131 as it was in the field determined to be effective in the effectiveness determiner 132 due to the fact that the determination output becomes a high level signal, "1". Further, the AND circuit 133 outputs a low level signal, "0" in the field determined to be ineffective in the effectiveness determiner 132 without depending on the determination output of the up-convert material determiner 131 due to the fact that the determination output becomes a low level signal, "0".

The image process strength determiner 135 outputs the detection signal Sdet indicating the low quality up-convert material likelihood of the interlaced input image data Vin. In the embodiment, the detection signal Sdet changes in a range 0~16, and the low quality up-convert material likelihood becomes higher as the value becomes larger. The image process strength determiner 135 constructs a detection signal detector.

The image process strength determiner 135 changes values of the detection signal Sdet according to a control signal SC provided from the determination stabilizer 134 for each field. That is, when the image process strength determiner 135 is provided the control signal SC from the determination stabilizer 134 to control so as to raise value of the detection signal Sdet, it increases value of the detection signal Sdet by only 1 step. In this case, when the value of the detection signal Sdet is the maximum value, "16", the value is preserved. Further, the image process strength determiner 135 lowers the value of the detection signal Sdet by only one step when the control signal SC to control so as to lower the detection signal Sdet from the determination stabilizer 134. In this case, when the value of the detection signal Sdet is the minimum value of "0", the value is preserved.

The determination stabilizer 134, on the basis of the output of the AND circuit 133, outputs the control signal SC to control value of the detection signal Sdet for the image process strength determiner 135 whenever the output of the AND circuit 133 is determined, that is, for each field in which the present (Next) field constructs a pair when the input image data Vin is film material, and for each field when the input image data Vin is video material.

The determination stabilizer 134 determines whether the output for a predetermined number M of the latest fields of the AND circuit 133 includes the high level signal "1" whose number is equal to or greater than a predetermined number N for each field. Further, the determination stabilizer 134 outputs the control signal SC to control so as to raise value of the detection signal Sdet when the number of the high level signal "1" is equal to or greater than a predetermined number N. Further, the determination stabilizer 134 outputs the control signal SC to control so as to reduce value of the detection signal Sdet when the number of the high level signal "1" is less than the predetermined number N.

Figure 10:
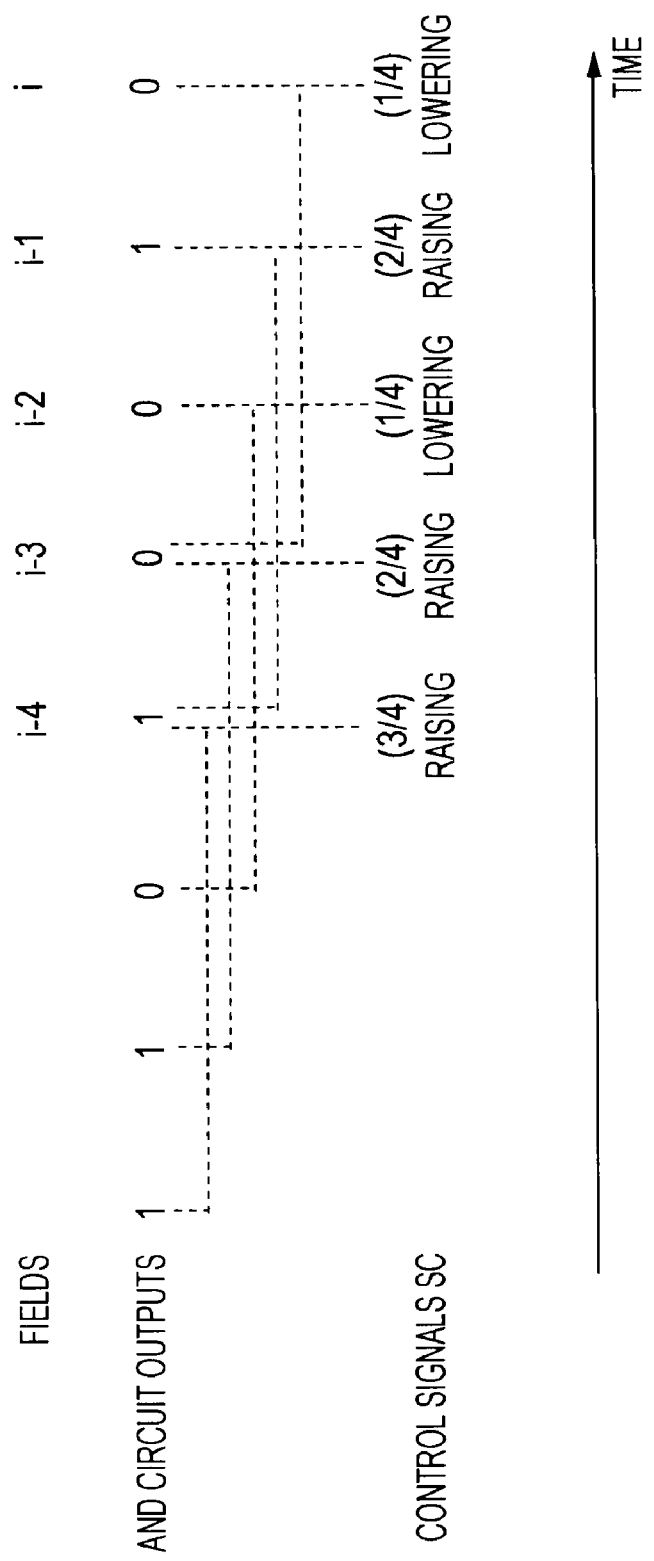
FIG. 10 is a diagram illustrating an example of a control signal output by the determination stabilizer (M=4, N=2)

FIG. 10 illustrates an example of a control signal SC output from the determination stabilizer 134 when the input image data Vin is video material and M=4 and N=2 are set, for example. For example, as to a field (i-4), 3 high level signals "1" are included in the latest 4 fields. Accordingly, the determination stabilizer 134 outputs the control signal CS to control so as to raise value of the detection signal Sdet. Further, for example, as to a field i, 1 high level signal "1" is included in the latest 4 fields. Accordingly, the determination stabilizer 134 outputs the control signal SC to control so as to lower value of the detection signal Sdet.

Figure 11:
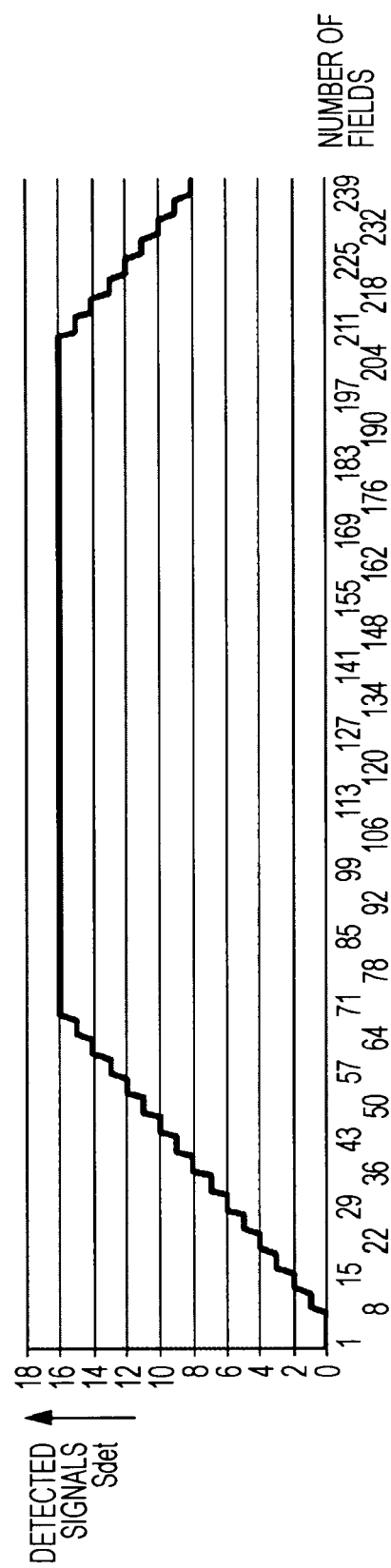
FIG. 11 is a diagram illustrating a change example of a detection signal output from the image process strength determiner.
Figure 12:
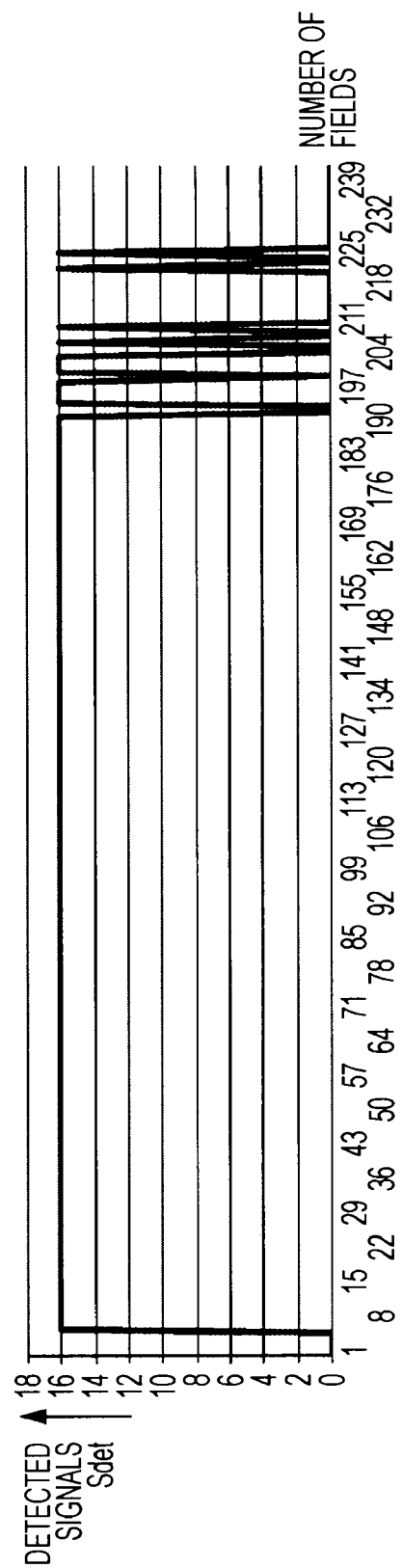
FIG. 12 is a diagram illustrating a comparative example with respect to a change example of detection signal of the invention.

FIG. 11 illustrates a modified example of the detection signal Sdet output from the image process strength determiner 135. As described above, since the value of the detection signal Sdet is controlled by the control signal SC from the determination stabilizer 134, the value does not change sharply. FIG. 12 illustrates a comparison example that has the same AND circuit 133 as the example of FIG. 11. This example is an example in which the detection signal Sdet is the maximum value "16" when an output of the AND circuit 133 is the high level signal "1" and the detection signal Sdet is the minimum value "0" when the output is the low level signal "0". In the case of this example, the value of the detection signal Sdet sharply changes from "0" to "16", or from "16" to "0".

Although not described above, the I/P converter 110 has a scene change determiner 111. The scene change determiner 111 determines whether a scene change occurs or not on the basis of the interlaced input image data Vin for each field. The scene change determiner 111 makes a determination using image data 2 fields of the present (Next) and 2 fields previous (Past) fields, for example. The scene change determiner 111 determines to be scene change when the addition of luminance difference absolute values between the present (Next) field and the 2 fields previous (Past) field exceeds a predetermined threshold value.

A determination output CI of the scene change determiner 111 is transmitted to the image process strength determiner 135 of the up-convert material detector 130. The image process strength determiner 135 resets the detection signal Sdet to "0" on the basis of the determination output CI when the scene change occurs. It is because there is a possibility of a change of material, that is, the material may be changed from the low quality up-convert material to material different from it when there was the scene change.

The image processor 120 performs a process based on the detection signal Sdet of the up-convert material detector 130 with respect to the progressive image data Vo1 (1080p) converted and obtained in the I/P converter 110 and obtains the output image data Vout (1080p). The image processor 120 has a low pass filter 121, an α blend unit 122, and an enhance unit 123.

The low pass filter 121 performs a low pass filter process in the vertical direction on the progressive image data Vo1 converted and obtained in the I/P converter 110. The α blend unit 122 mixes the progressive image data Vo1 obtained by being converted in the I/P converter 110 and the progressive image data Vo2 that are filter processed in the low pass filter 121 in a ratio according to the detection signal Sdet. That is, the α blend unit 122 performs an a blend process on the basis of an equation (3) when the output image data is Vo3. In the equation (3), α=Sdet/16.

$$Vo3=(1-\alpha)*Vo1+\alpha*Vo2 \qquad (3)$$

In this case, when the low quality up-convert material likelihood of the interlaced input image data Vin is high, the value of the detection signal Sdet becomes large. Accordingly, a mixture ratio of the image data Vo2 to which the low pass filter process is performed in the vertical direction to the output image data Vo3 becomes high, and the horizontal strip display is suppressed. Meanwhile, when the low quality up-convert material likelihood of the interlaced input image data Vin is low, the value of the detection signal Sdet becomes small. Accordingly, the mixture ratio of the image data Vo2 to which the low pass filter process is performed in the vertical direction to the output image data Vo3 becomes low, and the reduction of the vertical resolution is suppressed.

The enhance unit 123 performs an emphasis process of high frequency component with respect to the progressive image data Vo3 output from the α blend unit 122, and outputs the progressive output image data Vout (1080p). The enhance unit 123 makes the emphasis amount smaller as the value of the detection signal Sdet of the up-convert material detector 130 becomes larger. It is because there is a concern that only noise component such as a horizontal strip display component is emphasized without high frequency component to be emphasized in the image data, when the low quality up-convert material likelihood of the interlaced input image data Vin is high.

[Operation of the Image Processing Apparatus]

An operation of the image processing apparatus 100 illustrated in FIG. 1 is described. The interlaced input image data Vin (1080i) is input to the I/P converter 110. In the I/P converter 110, the interlaced input image data Vin (1080i) is converted into the progressive image data Vo1 (1080p). The I/P converter 110 detects whether the input image data Vin is film material or not, and performs I/P conversion using different method depending on whether the input image data Vin is film material or video material.

When the input image data Vin is film material, the I/P converter 110 performs a pull down inverse conversion in which an odd line and an even line of 2 fields constructing a pair are combined in each field of Current tense and obtains frame image data. The I/P converter 110 uses addition of luminance difference absolute values (field difference) between 1 field previous (Current) and present (Next) fields, and determines which of the present (Next) and 2 fields previous (Past) constructs a pair.

In this case, while the I/P converter 110 determines that the 2 fields previous (Past) field is a pair when the difference is large, it determines that the present (Next) field is a pair when the field difference is small. When the interlaced input image data Vin is film material, pair determination information PI is transmitted to the up-convert material detector 130 from the I/P converter 110 for each field.

Further, when the interlaced input image data Vin (1080*i*) is video material, the I/P converter 110 prepares interpolation pixel data of Current tense by inter-field interpolation or in-field interpolation. The I/P converter 110 generates frame image data by combining interpolation pixel data lines of Current tense with real pixel data lines of Current tense.

The I/P converter 110 detects motion of image corresponding to interpolation position of the 1 field previous (Current) field. Further, when it is determined that image is still, interpolation pixel data of Current tense are prepared by the inter-field interpolation. Meanwhile, when it is determined that image is moving, interpolation pixel data of Current tense are prepared by the in-field interpolation, for example.

When the input image data Vin is video material, number information MI indicating the number of pixels (still pixel number) determined to be still in the entire screen is transmitted from the I/P converter 110 to the up-convert material detector 130 for each field.

The up-convert material determiner 131 of the up-convert material detector 130 determines whether the interlaced input image data Vin is the low quality up-convert material or not for each field. The up-convert material detector 130 is provided with sum of the inter-field pixel value differences, $\Sigma Vcn$, and sum of the in-field pixel value differences, $\Sigma Vn$ from the I/P converter 110. The up-convert material determiner 131 compares the ratio, $\Sigma Vcn/\Sigma Vn$ of the sums, $\Sigma Vcn$ and $\Sigma Vn$, with threshold value Tha, and determines whether the interlaced input image data Vin is low quality up-convert material or not on the basis of the comparison result.

When the interlaced input image data Vin is the low quality up-convert material and a horizontal strip display state is generated, sum of the inter-field pixel value differences, $\Sigma Vcn$ is greater than the in-field pixel value differences, $\Sigma Vn$. The up-convert material determiner 131 determines that the interlaced input image data Vin to be the low quality up-convert material when the ratio, $\Sigma Vcn/\Sigma Vn$ exceeds the threshold value Tha (>1), and outputs the high level signal "1". Further, the up-convert material determiner 131 determines that the interlaced input image data Vin is not the low quality up-convert material when the ratio, $\Sigma Vcn/\Sigma Vn$ is less than the threshold value Tha, and outputs the low level signal "0".

The effectiveness determiner 132 determines effectiveness of the determination output of the up-convert material determiner 131 described above each field. The above described sums $\Sigma Vcn$, $\Sigma Vn$ are produced using 2 fields image data of the present (Next) and 1 field previous (Current). When the input image data Vin is the film material described above, $\Sigma Vcn > \Sigma Vn$ may be made in the case that the 2 fields do not construct a pair even though the input image data Vin is not the low quality up-convert material.

When the input image data Vin is the film material described above, pair determination information PI is transmitted from the I/P converter 110 to the effectiveness determiner 132 for each field. The effectiveness determiner 132 determines the effectiveness of the determination output of the up-convert material determiner 131 described above on the basis of the pair determination information PI. Further, when the present (Next) field constructs a pair, the effectiveness determiner 132 determines to be effective and outputs a high level signal "1" as a determination output. Further, the effectiveness determiner 132 does not output a determination output when the 2 fields previous (Past) field constructs a pair.

Further, as described above, the sums, $\Sigma Vcn$ and $\Sigma Vn$ are produced using image data of 2 fields of the present (Next) and 1 field previous (Current). When the input image data Vin is the video material described above, $\Sigma Vcn > \Sigma Vn$ may be made in the case that there is a motion in the image of each field even though the input image data Vin is not the low quality up-convert material.

When the input image data Vin is video material, the number information MI indicating the number of pixels determined to be still in the entire screen is transmitted from the I/P converter 110 to the effectiveness determiner 132 for each field as described above. The effectiveness determiner 132 determines effectiveness of the determination output of the up-convert material determiner 131 described above on the basis of the number information MI. Further, when the number of the pixels determined to be still in the entire screen exceeds a predetermined threshold value Thb, the effectiveness determiner 132 determines to be effective and outputs a high level signal "1" as a determination output. Further, when the number of the pixels determined to be still in the entire screen is equal to or less than the predetermined threshold value Thb, the effectiveness determiner 132 determines to be ineffective and outputs a low level signal "0" as a determination output.

Determination output of the up-convert material determiner 131 and determination output of the effectiveness determiner 132 are provided to the AND circuit 133. A logic product of both determination outputs may be obtained in the AND circuit 133. A determination output of the up-convert material determiner 131 is output as it is in the AND circuit 133 due to the fact that a determination output becomes a high level signal "1" in the field determined to be effective in the effectiveness determiner 132. Further, a low level signal "0" is output in the AND circuit 133 without depending on the determination output of the up-convert material determiner 131 due to the fact that the determination output becomes a low level signal "0" in the field determined to be ineffective in the effectiveness determiner 132. The output of the AND circuit 133 is provided to the determination stabilizer 134.

In the determination stabilizer 134, the control signal SC to control value of the detection signal Sdet for the image process strength determiner 135 is obtained on the basis of output of the AND circuit 133 for each time when output of the AND circuit 133 is determined, that is, for each field in which the present (Next) field constructs a pair when the input image data Vin is film material and for each field when the input image data Vin is video material.

The determination stabilizer 134 determines whether the number of the high level signal "1" in the output of a predetermined number M of the latest fields of the AND circuit 133 is equal to or more than a predetermined number N for each field. Further, the determination stabilizer 134 outputs the control signal SC to control so as to raise the value of the detection signal Sdet when the number of the high level signal "1" is equal to or more than a certain number N. Further, the determination stabilizer 134 outputs the control signal SC to control so as to lower the value of the detection signal Sdet when the number of the high level signal "1" is less than the certain number N.

As described above, the control signal SC output from the determination stabilizer 134 is provided to the image process strength determiner 135. The image process strength determiner 135 adjusts the value of the detection signal Sdet according to the control signal SC. That is, the image process strength determiner 135 raise the value of the detection signal Sdet by 1 step when the control signal SC to control so as to raise the value of the detection signal Sdet is provided. Further, the image process strength determiner 135 lowers the value of the detection signal Sdet by 1 step when the control signal SC to control so as to lower the value of the detection signal Sdet is provided. As such, the detection signal Sdet is not changed sharply even though the output of the AND circuit 133 frequently changes between "1" and "0" due to the fact that the determination stabilizer 134 is interposed between the AND circuit 133 and the image strength signal determiner 135.

Further, the scene change determiner 111 of the I/P converter 110 determines whether scene change occurs each field on the basis of the interlaced input image data Vin. The determination output CI of the scene change determiner 111 is transmitted to the image process strength determiner 135. The image process strength determiner 135 resets the value of the detection signal Sdet as "0" on the basis of the determination output CI in the case of the scene change. It is because there is a possibility of material change, that is, the low quality up-convert material may be changed to material having different property in the case that there was the scene change.

The image processor 120 performs a process based on the detection signal Sdet of the up-convert material detector 130 with respect to the progressive image data Vo1 ($1080p$) converted in the I/P converter 110 and then the output image data Vout ($1080p$) are obtained. That is, the output image Vo1 output from the I/P converter 110 is directly provided to the α blend unit 122. Further, the output image data Vo1 output from the I/P converter 110 is provided to the low pass filter 121. Further, the image data Vo2 obtained by performing a vertical low pass filter process in the low pass filter 121 is provided to the α blend unit 122.

The α blend unit 122 is provided with the detection signal Sdet of the up-convert material detector 130. The image data Vo1 and the data Vo are mixed in the α blend unit 122 in the ratio according to the detection signal Sdet, so that the output image data Vo3 is obtained (see equation (3)). In this case, the detection signal Sdet becomes large when the low quality up-convert material likelihood of the output image data Vin is high. Accordingly, mixture ratio of the image data Vo2 in which low pass filter process is performed in the vertical direction to the output image data Vo3 becomes high, and the horizontal strip display is suppressed. Meanwhile, when the low quality up-convert material likelihood of the interlaced input image data Vin is low, the value of the detection signal Sdet becomes small. Accordingly, the mixture ratio of the image data Vo2 in which the low pass filter process is performed in the vertical direction to output image data Vo3 becomes low, and reduction of the vertical resolution is suppressed.

The output data Vo3 of the α blend unit 122 is provided to the enhance unit 123. The enhance unit 123 is provided with the detection signal Sdet of the up-convert material detector 130. In the enhance unit 123, an emphasis process of the high frequency component with respect to the progressive image data Vo3 output from the α blend unit 122 is performed, so that the progressive output image data Vout is obtained. In the enhance unit 123, the emphasis amount becomes smaller as the value of the detection signal Sdet becomes larger. It is because only noise component such as the horizontal strip display component may be emphasized without the high frequency component to be emphasized in the image data, when the low quality up-convert material likelihood of the interlaced input image data Vin is high.

Figure 13:
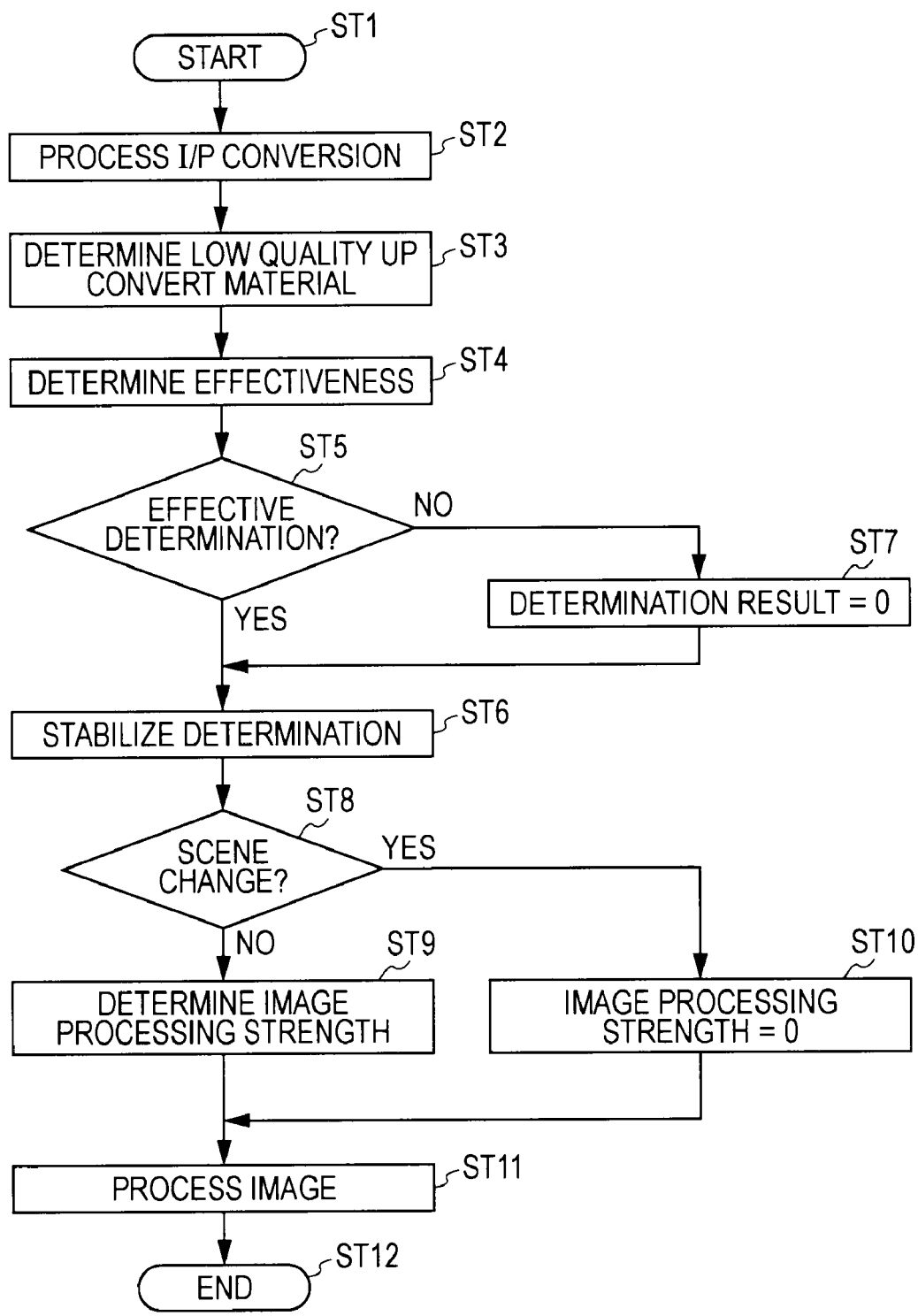
FIG. 13 is a flow chart illustrating a procedure of 1 frame portion in an image process apparatus.

The flow chart in FIG. 13 schematically illustrates a process procedure of 1 field in the image processing apparatus 100 illustrated in FIG. 1.

The image processing apparatus 100 starts process at step ST1, and then proceeds to step ST2. At step ST2, the image processing apparatus 100 converts the interlaced input image data Vin ($1080i$) into the progressive image data Vo1 ($1080p$) using the I/P converter 110.

Next, the image processing apparatus 100 determines whether the interlaced input image data Vin are low quality up-convert material or not by the up-convert material determiner 131 at step ST3. Further, the image processing apparatus 100 determines the effectiveness of the determination of step ST3 by the effectiveness determiner 132 at step ST4.

Next, the image processing apparatus 100 determines whether an effectiveness determination result of step ST4 is effective or not at step ST5. When the effectiveness determination result is determined to be effective, the image processing apparatus 100 performs the determination stabilizer process by the determination stabilizer 134 using the determination result of step ST3 as it is, at step ST6. Meanwhile, when the effectiveness determination result is determined to be ineffective, the image processing apparatus 100 makes the determination result "0" at step ST7 and then performs the determination stabilization process by the determination stabilizer 134 at step ST6.

Next, the image processing apparatus 100 determines whether there is a scene change at step ST8. When there is no scene change, the image processing apparatus 100 decides a detection signal Sdet indicating an image process strength, that is, the low quality up-convert material likelihood by the image process strength determiner 135 using the result of the determination stabilization process at step ST9. Meanwhile, when there is the scene change, the image processing apparatus 100 makes the image process strength 0 (Sdet=0) at step ST10.

Next, the image processing apparatus 100 performs processes such as horizontal strip suppress process and enhance process by the image processor 120 according to the image process strength (detection signal Sdet) at step ST11. Further, the image processing apparatus 100 ends process after processing step ST11, at step ST12.

In the image processing apparatus 100 illustrated in FIG. 1, the up-convert material detector 130 detects the low quality up-convert material likelihood of the input image data Vin on the basis of ratio of the sum of the inter-field pixel value differences, $\Sigma Vcn$, and the sum of the in-field pixel value differences, $\Sigma Vn$. Further, in the image processor 120, the progressive image data Vo1 converted and obtained in the I/P converter 110 is processed on the basis of the detection signal Sdet obtained in the up-convert material detector 130, so that the output image data Vout is obtained. Accordingly, it is possible to perform a detection of the low quality up-convert material at a high precision and to improve the image quality preferably.

Further, in the image processing apparatus 100 illustrated in FIG. 1, the up-convert material detector 130 includes a determination stabilizer 134 interposed between the AND circuit 133 and the image process strength determiner 135. Accordingly, even though the output of the AND circuit 133 changes from "1" to "0" or from "0" to "1", the detection signal Sdet indicating the low quality up-convert material likelihood output from the image process strength determiner 135 does not change sharply. Accordingly, for example, in the image processor 120, it is possible to prevent the mixture ratio of the image data Vo2 obtained by performing the low pass filter process from changing sharply and change of the image process from being remarkable.

Further, in the image processing apparatus 100 illustrated in FIG. 1, the up-convert material detector 130 determines the effectiveness of the up-convert material determiner 131 by the effectiveness determiner 132. Further, the determination stabilizer 134 uses "0" for the field determined not to be effective in the effectiveness determiner 132 regardless of whether the determination output of the up-convert material determiner 131 is "1" or "0". Accordingly, it is possible to raise the precision of the detection signal Sdet indicating the low quality up-convert material likelihood output from the image process strength determiner 135.

Further, in the image signal processing apparatus 100 illustrated in FIG. 1, in the image processor 120, when there occurs the scene change, the detection signal Sdet is reset as the minimum value in the image process strength determiner 135 of the up-convert material detector 130. Accordingly, when a change to a material other than the low quality up-convert material has been occurred, for example, it is possible to immediately stop the mixture of the image data Vo2 obtained by performing the low pass filter process in the image processor 120 and to prevent the vertical resolution from being deteriorated unnecessarily.

Further, in the image signal processing apparatus 100 illustrated in FIG. 1, the output image data Vo1 of the I/P converter 110 and the image data Vo2 to which a filter process is performed are mixed in a ratio according to the detection signal Sdet of the up-convert material detector 130. Accordingly, when the low quality up-convert material likelihood is high, the mixture ratio of the image data Vo2 becomes high, and it is possible to suppress the horizontal strip display preferably. Further, when the low quality up-convert material likelihood is low, the mixture ratio of the image data Vo2 becomes low, and it is possible to prevent the vertical resolution from being deteriorated.

2. MODIFIED EXAMPLE

Further, in the embodiment described above, the inter-field pixel value difference Vcn and the in-field pixel value difference Vn are obtained using data of each pixel illustrated in FIG. 8. That is, the inter-field pixel value difference Vcn is obtained by data of the notable pixel C of the present (Next) field and of pixels B and D of the 1 field previous (Current) field adjacent to the notable pixel C in the vertical direction. Further, the in-field pixel value Vn is obtained by the data of the notable pixel C of the present (Next) field and of the pixels A, E adjacent to the notable pixel C in the vertical direction. However, it is desirable that the inter-field pixel value difference Vcn and the in-field pixel value difference Vn are obtained by reversing each pixel of the present (Next) and 1 field previous (Current) fields.

Further, in the embodiment described above, the film material is prepared by converting the progressive image data having 24 frames per second using 2-3 pull down method. However, it is unquestionably possible to apply the advantage of the invention to the film material prepared by converting the progressive image data having 30 frames per second using 2-2 pull down method.

Further, in the embodiment of the invention, the horizontal strip control process and enhance process are performed using the α blend in the image processing apparatus 120. However, the process performed on the basis of the detection signal Sdet of the low quality up-convert material likelihood from the up-convert material detector 130 is not restricted to the embodiment.

The present application contains subject matter related to that disclosed in Japanese Priority Patent Application JP 2009-165195 filed in the Japan Patent Office on Jul. 14, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A image processing apparatus, comprising:
an interlace/progressive converter that converts interlaced input image data into progressive image data;
an up-convert material detector that detects low quality up-convert material likelihood of the interlaced input image data; and
an image processor that obtains output image data by processing progressive image data obtained by being converted in the interlace/progressive converter on the basis of the detected signal of the up-convert material detector,
wherein the up-convert material detector detects the low quality up-convert material likelihood on the basis of ratio of the sum of an inter-field pixel value difference by pixel data of a notable pixel of the first field and a pixel of the second field adjacent to the notable pixel in the vertical direction, and the sum of in-field pixel value difference by pixel data of the notable pixel of the first field and a pixel of the first field adjacent to the notable pixel in the vertical direction, the pixels in a predetermined area being obtained as sequential notable pixels using image data of a first field and a second field that are continuous in each field.

2. The image processing apparatus according to claim 1, wherein the up-convert material detector includes an up-convert material determiner that outputs a first determination output when the ratio of a first sum and a second sum exceeds a predetermined threshold value and outputs a second determination output when the ratio is equal to or less than the predetermined threshold value, the first sum being the sum of the inter-field pixel value difference and the second sum being the sum of the in-field pixel value difference;
a detection signal output unit that outputs a detection signal indicating the low quality up-convert material likelihood; and
a determination stabilizer that determines whether the determination output for a predetermined number of the latest field of the up-convert material determiner includes a predetermined number of the first determination output or more for each field, and controls the detection signal output unit so as to raise the detection signal value when the determination output includes the predetermined number of the first determination output or more, and lowers the detection signal value when the determination output does not include the predetermined number of the first determination output or more.

3. The image processing apparatus according to claim 2, wherein the up-convert material detector further includes an effectiveness determiner to determine whether the determination output of the up-convert material determiner is effective or not for each field; and
wherein the determination stabilizer uses the determination output out of the up-convert material determiner for fields determined to be effective in the effectiveness determiner, and uses the second determination output for fields determined not to be effective in the effectiveness determiner.

4. The image processing apparatus according to claim 3, wherein the effectiveness determiner determines that fields in which the first and second fields are prepared from the same frame of the image data are effective, when the interlaced input image data are interlaced image data prepared by converting progressive image data that have 24 frames or 30 frames per second using 2-3 pull down scheme or 2-2 pull down scheme.

5. The image processing apparatus according to claim 3, wherein the effectiveness determiner determines whether each field is a still field and determines the still field to be effective, when the interlaced input image data are not interlaced image data prepared by converting progressive image data that have 24 frames or 30 frames per second using 2-3 pull down scheme or 2-2 pull down scheme.

6. The image progressing apparatus according to claim 2, further including a scene change determiner that determines whether a scene change occurs or not on the basis of the interlaced input image data,
wherein the detection signal output unit resets the detection signal as the minimum value when the scene change determiner determines that the scene change occurs.

7. The image progressing apparatus according to claim 1, wherein the image processor mixes the progressive image data obtained by being converted in the interlace/progressive converter and image data obtained by performing a low pass filter processing in the vertical direction to the image data in the ratio responded to the detection signal of the up convert material detector, and obtains output image data.

8. An image processing method comprising the steps of:
converting interlaced input image data into progressive image data;
detecting a low quality up-convert material likeliness of the interlaced image data; and
processing the progressive image data obtained by being converted in the interlace/progressive conversion step on the basis of the detection signal of the up-convert material detection step so as to obtain output image data,
wherein in the up-convert material detection step, the low quality up-convert material likeliness is detected on the basis of ratio of the sum of an inter-field pixel value difference by pixel data of a notable pixel of the first field and a pixel of the second field adjacent to the notable pixel in the vertical direction, and the sum of in-field pixel value difference by pixel data of the notable pixel of the first field and a pixel of the first field adjacent to the notable pixel in the vertical direction, the pixels in a predetermined area being obtained as sequential notable pixels using image data of a first field and a second field that are continuous in each field.

\* \* \* \* \*